No. 753,401. PATENTED MAR. 1, 1904.
H. E. IRWIN.
VEHICLE TIRE.
APPLICATION FILED SEPT. 3, 1903.
NO MODEL. 3 SHEETS—SHEET 1.
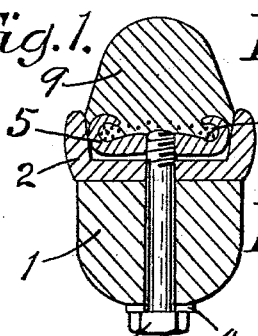
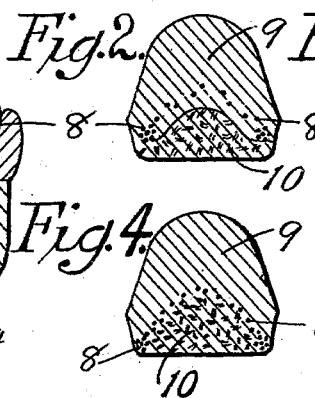
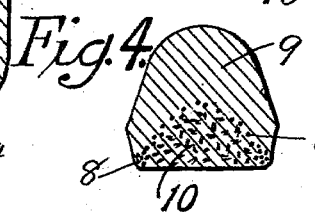
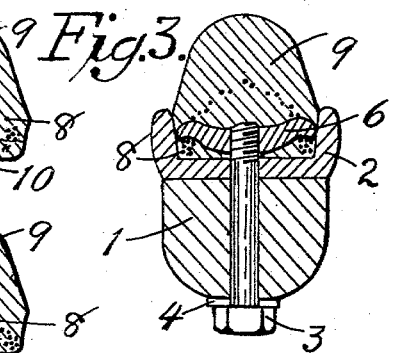
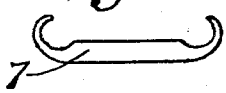
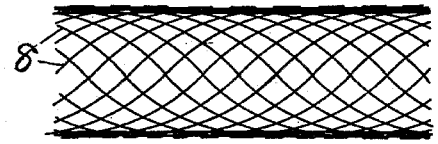
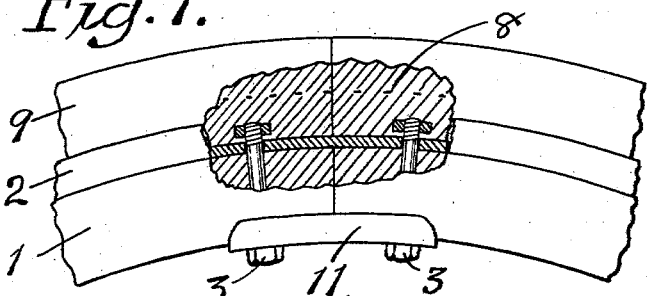
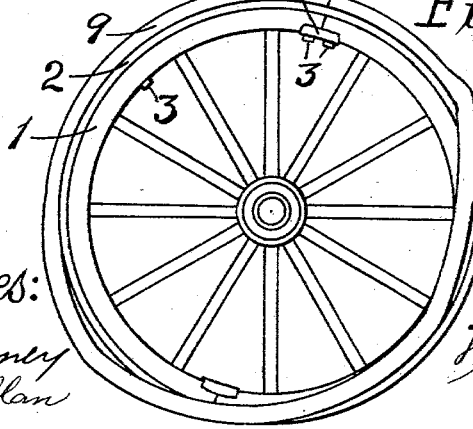
Witnesses:
Clyde Finney
H. J. McMillan
Inventor:
Herbert E. Irwin

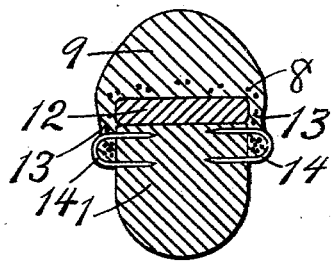
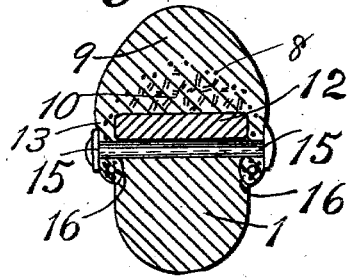
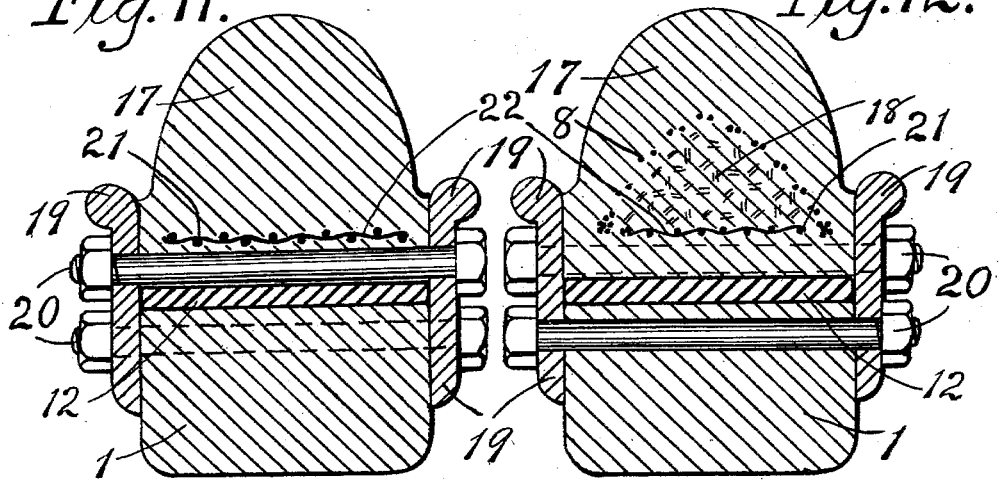
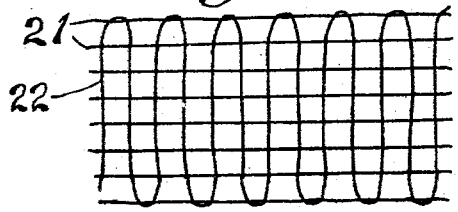

No. 753,401. PATENTED MAR. 1, 1904.
H. E. IRWIN.
VEHICLE TIRE.
APPLICATION FILED SEPT. 3, 1903.
NO MODEL. 3 SHEETS—SHEET 3.
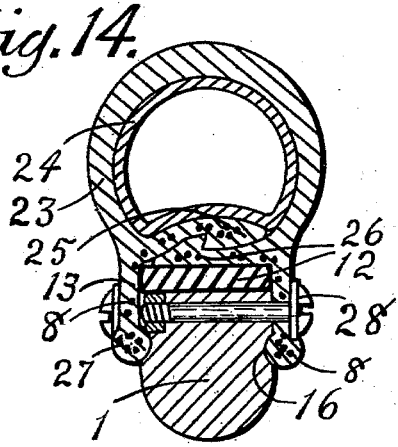
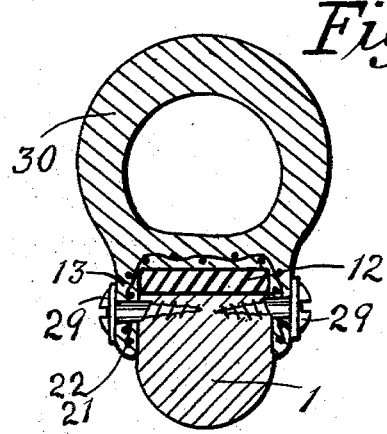
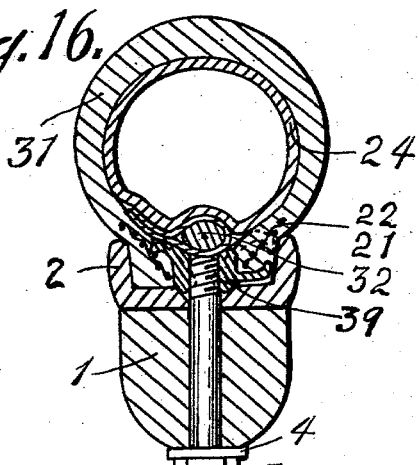
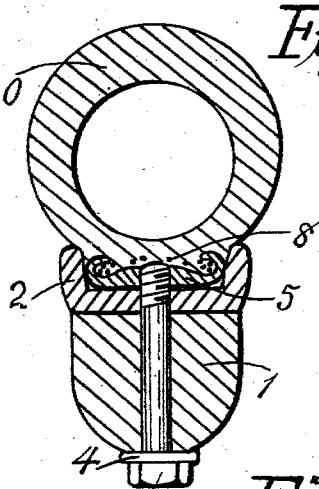
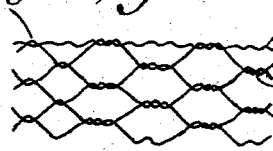
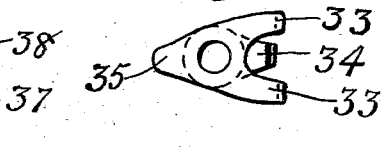
Witnesses:
Clyde Finney
H. J. McMillan
Inventor:
Herbert E. Irwin No. 753,401. Patented March 1, 1904.

UNITED STATES PATENT OFFICE.

HERBERT E. IRWIN, OF GALESBURG, ILLINOIS, ASSIGNOR TO IRWIN RUBBER COMPANY, OF CHICAGO, ILLINOIS, A CORPORATION OF ILLINOIS.

VEHICLE-TIRE.

SPECIFICATION forming part of Letters Patent No. 753,401, dated March 1, 1904.

Application filed September 3, 1903. Serial No. 171,713. (No model.)

*To all whom it may concern:*

Be it known that I, HERBERT E. IRWIN, a citizen of the United States, residing at Galesburg, in the county of Knox and State of Illinois, have invented certain new and useful Improvements in Vehicle-Tires, of which the following is a specification.

My invention has relation to improvements in that class of vehicle-tires in which the wood felly is surrounded by a metal tire, flat or channeled, on which is secured an outside rubber tire, either cushion or pneumatic, and has for its primary object to combine durability and a positive tire engagement in such a tire and to have it adaptable for use upon the wheels of vehicles of all kinds.

Heretofore in the construction of tires of the solid-cushion class it has been customary to form the metallic tire with a channel in its outer face and to form the rubber portion in a strip through which extend passages longitudinally into which are inserted retaining-bands, round or flat, single or multiple, which are brought together and held in tension until united and afterward the ends of the rubber tire. This construction, while measurably satisfactory, is objectionable in many features, the most prominent of which are that the straining of the retaining-bands and rubber to effect a secure setting of the tire necessitates intricate and costly machinery and considerable expenditure of time and labor. Again, the use of retaining-bands is a source of weakness to the rubber tire, as it has reduced the stock in cross-section at the line of the retaining-bands. The retaining-wires will also cut down through the rubber tire, thus causing the retaining wires or bands to become loose, which permits the tire to creep and turn on its side and to quickly wear out.

In large sizes of solid-rubber tires it is customary to make the tire endless, with endless wire bands embedded therein, and to secure the tire to the wheel-rim by means of side detachable flanges. Experience has shown that such endless tires break away at the sides and above the retaining-bands, and before the tread has shown but little wear the tire has given out internally.

The use of canvas or cotton fabric in the construction of solid-rubber tires is objectionable, for the reason that it soon becomes rust-eaten and worthless and also in that it is subject to blistering or breaking loose from the rubber, and, again, in single-tube pneumatic vehicle-tires it is customary to cement them in a crescent steel rim and to secure them at intervals by lugs which are embedded in the fabric of the tire. Water works in between the tire and the rim and loosens up the cement, allowing the entire strain to come upon the lugs, which in time tear loose from the tire.

Whether single-tube pneumatic or double-tube detachable or solid cushion, the object of this invention is to overcome the foregoing objections by embedding in such tires woven-wire fabric and means to secure them easily and positively to wheels.

Another object of my invention is to construct and secure a rubber tire to a wheel having a plain flat metal tire mounted upon a wood felly, the said rubber tire being arranged to inclose the metal tire and to partially extend over the sides of the felly, which would prevent its sliding along a car-rail or other obstruction when crossing it at an angle, as in the case of a wheel having a metal channeled tire. Again, such a tire could be removed from the wheel and left off during the winter season, if desired, as rubber tires are not of so much value then.

A further object of the invention is to construct and secure a pneumatic tire to ordinary vehicle-wheels, whether having channeled or plain metal tires thereon, and which also will avoid the destructive rim-cutting feature.

Other objects will become apparent upon a more detailed description of the invention.

In the accompanying drawings, Figures 1 and 3 are transverse sectional views of a wheel-felly, a channeled metallic tire, and my improved rubber tire applied thereto. Figs. 2 and 4 show transverse sections of a rubber tire removed from the metallic tire. Fig. 5 is a plan view of a nut or lug. Fig. 6 is a plan view of a diagonally-woven wire fabric. Fig. 7 is an elevation of a segment of a wheel and tire with a broken part shown in central vertical section. Fig. 8 is an elevation of a wheel, showing the rubber tire partly in place. Figs. 9 and 10 are transverse sectional views of a wheel-felly, a flat metallic tire, and a rubber tire having overhanging sides. Figs. 11 and 12 show transverse sections of a wheel-felly, side detachable flanges, and an endless rubber tire. Fig. 13 is a plan view of a parallel-woven wire fabric. Fig. 14 is a transverse sectional view of a wheel-felly, a flat metallic tire, and a double-tube detachable pneumatic tire. Fig. 15 is a view showing a transverse section of a wheel-felly, a flat metallic tire, and a single-tube pneumatic tire. Fig. 16 is a transverse sectional view of a wheel-felly, a channeled metallic tire, and a double-tube detachable pneumatic tire. Fig. 17 is a transverse sectional view of a wheel-felly, a channeled metallic tire, and a single-tube pneumatic tire. Fig. 18 is a side elevation of the lug shown in Fig. 16 in cross-section. Fig. 19 is a top view of the same lug. Fig. 20 is a plan view of a woven-wire fabric.

Similar characters of reference indicate the same parts in the several figures of the drawings.

Referring by numerals to the accompanying drawings, 1 indicates a wood felly which is inclosed by a channeled metallic tire 2, as shown in Figs. 1, 3, 16, and 17, and by a plain metallic tire 12, as shown in Figs. 9, 10, 11, 12, 14, and 15. Metallic tire 2 forms a channel in its outer face, into which fits a compact solid-rubber compound 9, which rounds off gradually at its outer periphery and which is secured in the channel by the use of diagonally-woven wire fabric 8, having reinforced edges composed of several wires embedded in the tire-body, around which reinforced edges lug 5 clenches, being held firmly in the channel by cap-screw 3, which operates against washer 4 and through the wood felly and metallic tire into the lug 5, thereby drawing it tightly against the outer face of the channel. Lug 5 in Fig. 1 is in the nature of a nut possessing hooked wings. The lug or nut may be placed at any point in the tire desired by removing a notch from its base and inserting therein lug 7, as shown in Fig. 5, and by force bending or clenching the ends over the wire fabric and into the rubber, as shown by 5 in Fig. 1. It will be observed that the hooks on lug 5 rest against the sides of the channeled metallic tire, thereby supporting and preventing the hooks from opening.

6 represents a modified form of lug or nut which may be applied to a tire by removing a notch therefrom and inserting the lug therein, the ends of which extend over the outer wires of the woven fabric, thereby causing the tire to be securely locked in the rim by the use of a cap-screw.

The bases of the rubber tires, as shown in Figs. 2 and 4, are formed of a perforated, porous, or sponge-like rubber 10, the effect of which is to produce a better cushion or resilient tire.

The woven-wire fabric is preferably embedded in an arch form in the firmer compound of a rubber tire composed of a firm compound and a porous or more elastic compound, although it may be embedded at or near the junction of the two compounds.

A side elevation of a wheel is shown in Fig. 8, with the rubber tire partly in place, the ends having been secured to the wheel, after which the tire may be sprung into the channel and secured thereto by the cap-screws and lugs.

Fig. 7 illustrates an enlarged portion of the wheel shown in Fig. 8 at the point of the joint in the felly and rubber tire, with a small broken part shown in central vertical section, the joint in the felly being covered by clip 11.

Figs. 9 and 10 show a wood felly upon which is mounted a flat metallic tire that is inclosed by a rubber tire having inwardly-extending sides 13, which are secured to the felly by staples 14 or rivets 15. Woven-wire fabric is embedded in the base of the tire and also in the inwardly-extending sides. The edges of the wire fabric shown in Fig. 6 are composed of several wires, which are embedded in the inwardly-extending sides of the tire, giving those portions special strength and stability and which are also engaged by the staples or rivets, thereby firmly binding or locking the rubber tire to the wheel. In Fig. 10 the wood felly 1 is grooved at 16 to accommodate the slightly-enlarged edges of the inwardly-extending sides 13. The base of the rubber tire shown in Fig. 10 is composed of perforated, porous, or sponge-like rubber similar to that shown in Figs. 2 and 4. It is evident that a tire constructed with the inwardly-extending sides would have little difficulty in passing over car-rails or other similar obstacles at an angle, as is usually experienced in tires secured in metallic rims. The rubber tires, with the inwardly-projecting sides, may also be easily removed, when the fellies, with the flat metallic tires already fitted to them, may be used at once.

Figs. 11 and 12 represent a heavy rubber tire, preferably made endless, composed of a solid-rubber compound 17 and a soft, perforated, porous, or sponge-like rubber 18, which is supported at its sides by endless detachable flanges 19, that are secured to the wheel by means of bolts 20 passing through them and also through the wood felly and the base of the rubber tire, which prevents the tire from creeping. It is not of much importance that bolts pass through the rubber on wheels which do not receive traction-power. To give this type of rubber tire strength and lasting qualities, I have embedded within it parallel-woven wire fabric 21 22 near its base.

It is well known that a single wire embedded in rubber and under strain tends to cut as a knife. On the other hand, if the same given strain be applied to a number of smaller wires uniformly distributed the tendency of the wires to cut into the rubber is much lessened, because the strain is uniformly distributed over a much larger area.

It is important that all woven-wire fabric used in my tire construction should be openly woven—that is, the rubber on one side of the woven wire should penetrate it and unite with the rubber on the other side. In the case of cotton fabrics used in tire construction the rubber does not have the opportunity to penetrate the fabric and unite with the rubber on the other side of it, but depends wholly upon adhesion for its uniting with the fabric. Experience has shown that rubber and cotton fabrics are likely to separate under strain, which is known by the term of "blistering."

As small bones honeycomb the flesh of a fish, thereby giving it stability and form, just so rubber, being an elastic body, needs within itself a substantially non-elastic framework composed of small wires. Heretofore a band consisting of a wire or a flat strap has been used in the construction of rubber tires to secure them in place; but more commonly two wires have been used. This has the effect of a single or double backbone, as it were, to an elastic body and is by no means the equivalent of a framework possessing a large number of wires properly distributed or embedded within the tire-body.

In Figs. 2, 3, 4, 10, and 12 I have shown the woven-wire fabric in the form of an arch which may extend well up to the tread, thereby preventing a rent or rupture in the tire-body. A tire having a soft yielding base would naturally sacrifice in strength compared to one of a firmer rubber compound, and it is therefore important that woven-wire fabric extend over and around the soft-rubber portion to preserve the strength of the tire.

Fig. 14 shows an ordinary wood wheel-felly and flat metallic tire, on which is mounted a detachable double-tube pneumatic tire, the casing or cover 23 of which incloses an air-tube 24 and possesses inwardly-extending sides 13, which terminate in enlarged edges 27, that fit into grooved surfaces 16 of the felly. Above the flat metallic tire the hooked edges 25 and 26 of the tire engage each other, which holds the sides of the tire together and which also forms a good seat for the air-tube. The inwardly-extending sides 13 of the tire are secured to the wheel by means of bolts 28, passing through them and through the wood felly, engaging nuts sunken into the wood felly, which makes it possible to detach one side of the tire without removing the other side. It may be found desirable to place a metallic band on the exterior of the inwardly-extending sides of the casing, so that by having the bolts pass through perforations therein the inwardly-projecting sides of the rubber tire could be tightly drawn against the sides of the wheel throughout its circumference. Woven-wire fabric 8 is embedded in the extending edges of the casing 23 to strengthen and support those parts.

Fig. 15 illustrates a single-tube pneumatic tire mounted upon a wheel consisting of a wood felly and a plain metallic tire. 30 represents the tire-body, which is provided with inwardly-projecting sides 13, by means of which screws 29 secure the tire to the wheel. Woven-wire fabric 21 22 is embedded in the base of the tire and in the inwardly-extending sides.

It will be observed that Figs. 9 and 10 pertain to solid cushion-tires, which are very similar to the tires shown in Figs. 14 and 15, as each is mounted upon a wheel consisting of a wood felly and a plain metallic tire, while the securing means in the several figures consist of staples, rivets, bolts, and screws. A suitable tack or nail might be used instead of screws or staples.

Fig. 16 is a view of a detachable double-tube pneumatic tire, the cover or casing of which is designated by 31, the air-tube by 24, the securing lug or nut by 39, above which and between the flanges of the casing is a ring that is secured hinge-like to the inner side of the tire-casing, the object of the ring being to protect and to furnish a good seat for the air-tube.

Fig. 18 shows a side view, and Fig. 19 a top view, of a securing-lug shown in cross-section in Fig. 16. Tongues 33 and 34 hook toward each other and are firmly secured to one of the flanges of the tire, while tongue 35 overhangs the other flange, so that when the securing-lug is drawn down by cap-screw 3 the rubber tire is positively locked to the channeled metallic tire. Cover 31 is provided at its base with woven-wire fabric 21 22. It is essential that all securing-lugs engage the woven-wire fabric, so that they may firmly hold the tire in position on the metallic tire.

In Fig. 17, 30 represents the tire-body of a single-tube pneumatic tire with its base conformed to a metallic channeled tire and is secured thereto in a similar manner to that shown in Fig. 1.

As there are several different methods of constructing woven-wire fabric, I have shown as many different kinds in Figs. 6, 13, and 20. Each individual wire in the woven-wire fabric (shown in Fig. 20) may have a single loop over the other, as shown at 36, or a double loop or twist, as shown at 37. 38 represents a wire full of crimps. It may be desirable to run wire tape between corrugated rollers in order to crimp them, as in that condition they will stretch and yield much more readily under tension than when not crimped. It is important that woven-wire fabric should yield to facilitate the placing of the rubber tire upon the wheel; but without securing means the rubber tire would come off when in use.

Some of the drawbacks of the single-tube pneumatic tire as made at the present time are rim-cutting, the tearing loose of lugs which are embedded in cotton fabric at the base of the tire, and the lessening of resiliency of the tire due to the rim restraining the side walls from spreading out as the rim extends well up the sides of the tire to prevent it from rolling out. Rim-cutting is entirely avoided in the single-tube pneumatic tires, as shown in Figs. 15 and 17. Neither are these tires restricted at their sides, so that a maximum degree of resiliency is obtained, and as woven-wire fabric will stand greater strains than cotton fabric it is evident that the danger of the tires in tearing loose, as herein shown and described, is reduced to a minimum.

While I have shown my tires in connection with wheels having wood fellies, they are equally applicable to wheels having wire spokes or steel tubular spokes with metallic fellies, rims, or tires, and changes may also be made in the form of the securing-lugs, as herein shown, without departing from the spirit of my invention.

What I claim, and desire to secure by Letters Patent, is—

1. An elastic or pneumatic vehicle-tire having woven-wire fabric embedded within its body and means adapted to penetrate the said wire fabric whereby the tire is secured to a wheel-rim, substantially as described.

2. An elastic or pneumatic vehicle-tire having woven-wire fabric embedded within its body and means arranged at intervals adapted to enter openings in the tire-base and engage the said wire fabric only at the same stated intervals, substantially as described.

3. An elastic or pneumatic vehicle-tire having woven-wire fabric embedded within its body and metallic members adapted to pass through the said wire fabric whereby the tire is secured to a wheel-rim, substantially as described.

4. An elastic or pneumatic vehicle-tire having woven-wire fabric embedded within its body and a lug having inwardly-hooked edges engaging the said wire fabric whereby the tire is secured to a wheel-rim, substantially as described.

5. An elastic or pneumatic vehicle-tire having woven-wire fabric embedded within its body, a lug engaging the said wire fabric and a cap-screw passing through a wheel-rim and engaging the said lug, substantially as described.

6. An elastic or pneumatic vehicle-tire having woven-wire fabric embedded within its body, notches removed from the base of said tire wherein lugs are inserted engaging said wire fabric, and cap-screws passing through a wheel-rim and engaging the said lugs, substantially as described.

7. An elastic or pneumatic vehicle-tire having woven-wire fabric embedded within its body and lugs engaging the said wire fabric whereby the tire is secured in a channeled metallic tire of a wheel-rim, substantially as described.

8. An elastic or pneumatic vehicle-tire having woven-wire fabric embedded within its body and metallic members adapted to enter openings in the tire-base and engage the wire fabric, the said metallic members being engaged by means passing through the wood felly and metallic tire of a wheel-rim, substantially as described.

9. An elastic vehicle-tire composed of two rubber compounds, the outer or tread portion being firm and compact, the inner portion being soft or sponge-like, said tire having woven-wire fabric provided with reinforced edges embedded within its body, and means for engaging said reinforced edges whereby the tire is secured to a wheel-rim, substantially as described.

10. An elastic vehicle-tire, the outer or tread portion being composed of a firm, compact rubber compound, the base or inner portion being composed of a soft, perforated, porous, or sponge-like rubber compound, said tire having woven-wire fabric embedded longitudinally within its body, and means adapted to enter openings in the tire-base and engage the wire fabric, substantially as described.

11. An elastic vehicle-tire formed in a strip and composed of two rubber compounds, the outer or tread portion being firm and compact, the inner portion being soft or sponge-like, said tire having woven-wire fabric embedded longitudinally in an arch form above the said sponge-like rubber, and means penetrating the said wire fabric whereby the tire is secured to a wheel-rim, substantially as described.

12. An elastic vehicle-tire composed of two rubber compounds, the outer or tread portion being firm and compact, the base or inner portion being soft, porous, or sponge-like, said tire having woven-wire fabric embedded longitudinally in the form of an arch above the inner porous compound, and means entering openings in the said tire at intervals whereby the tire is secured to a wheel-rim, substantially as described.

13. An elastic vehicle-tire composed of two rubber compounds, the outer or tread portion being firm and compact, the base or inner portion being soft, porous, or sponge-like, said tire having woven-wire fabric embedded therein substantially surrounding the inner porous compound, substantially as described.

14. A pneumatic vehicle-tire consisting of an outer casing and an inner air-tube, said casing being rifted on its inner periphery and having adjacent to said rift beads or flanges wherein is embedded woven-wire fabric, a lug adapted to engage one of said flanges and to overhang the other flange, and means for engaging said lug to secure the tire in a channeled wheel-rim, substantially as described.

15. A pneumatic vehicle-tire consisting of an outer casing and an inner air-tube, said casing being rifted on its inner periphery and having adjacent to said rift beads or flanges wherein is embedded a woven-wire fabric, lugs adapted to engage one of said flanges and to overhang the other flange, and cap-screws arranged to engage said lugs to secure the tire in a channeled wheel-rim, substantially as described.

16. A pneumatic vehicle-tire consisting of an outer casing and an inner air-tube, said casing being rifted on its inner periphery and having adjacent to said rift beads or flanges wherein is embedded woven-wire fabric, lugs adapted to engage one of said flanges and to overhang the other flange, a hinged ring secured to the inner side of the outer casing and lying above said lugs, and means for detachably securing the tire to a channeled wheel-rim, substantially as described.

17. An elastic or pneumatic vehicle-tire having woven-wire fabric embedded within its body, said fabric being crimped, and means for securing said tire to a wheel-rim, substantially as described.

18. An elastic or pneumatic vehicle-tire having openly-woven crimped wire fabric embedded longitudinally within its body, lugs located in the said tire-base engaging the crimped woven-wire fabric, and means engaging said lugs for securing the tire to a wheel-rim, substantially as described.

19. An elastic or pneumatic vehicle-tire having woven-wire fabric embedded within its body, each wire of said fabric extending diagonally from one side of said fabric to the other, and means coöperating with the wire fabric whereby the tire is secured to a wheel-rim, substantially as described.

In testimony whereof I have signed my name to this specification in the presence of two subscribing witnesses.

HERBERT E. IRWIN.

Witnesses:
A. S. HAMILTON,
E. M. DUNN.